UNITED STATES PATENT OFFICE.

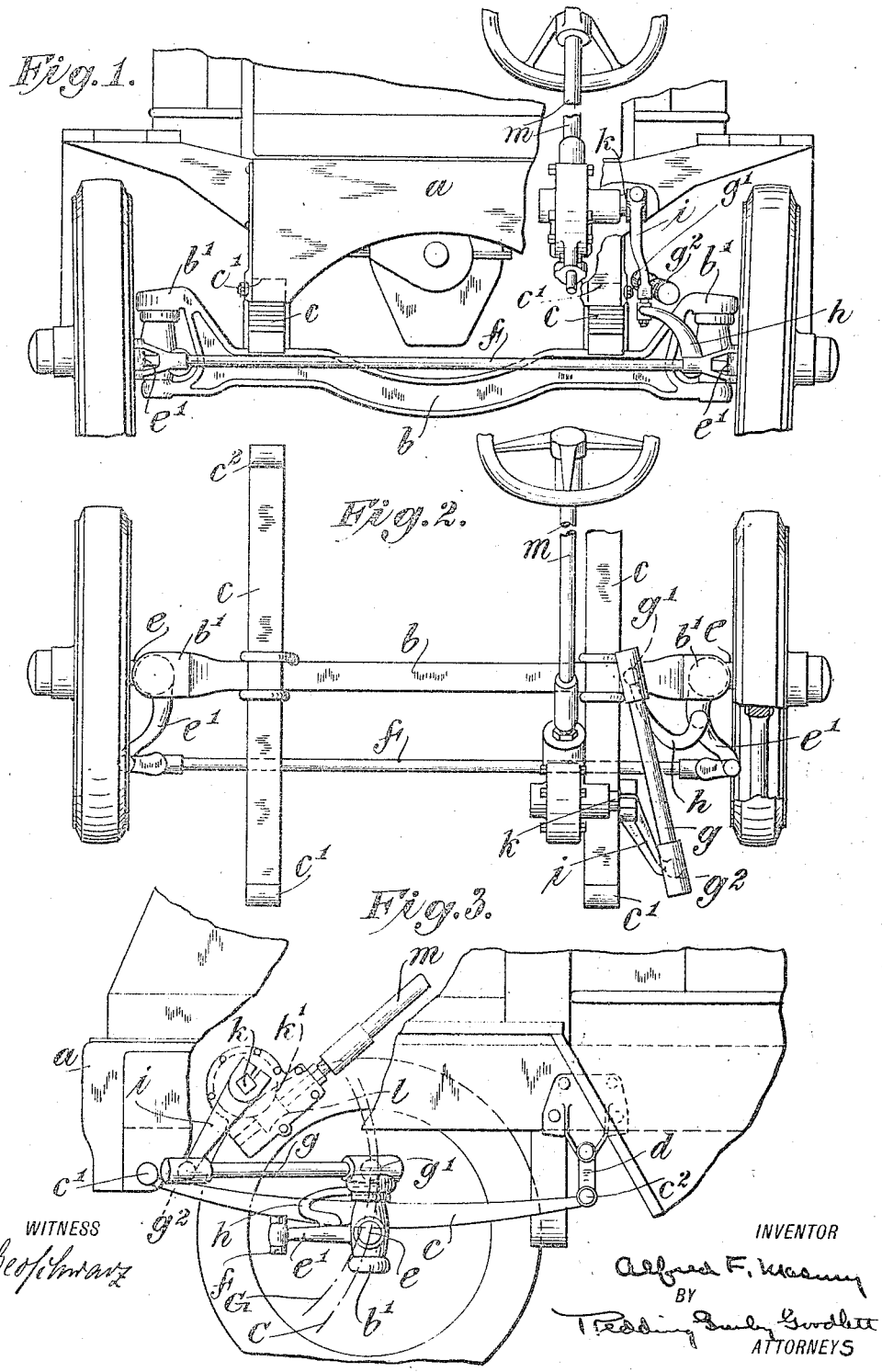

ALFRED F. MASURY, OF NEW YORK, N. Y., ASSIGNOR TO INTERNATIONAL MOTOR COMPANY, OF NEW YORK, N. Y., A CORPORATION OF DELAWARE.

STEERING MECHANISM FOR MOTOR-VEHICLES.

1,197,581.   Specification of Letters Patent.   Patented Sept. 5, 1916.

Application filed October 18, 1915. Serial No. 56,513.

*To all whom it may concern:*

Be it known that I, ALFRED F. MASURY, a citizen of the United States, and a resident of the borough of Manhattan of the city of New York, in the State of New York, have invented certain new and useful Improvements in Steering Mechanism for Motor-Vehicles, of which the following is a specification, reference being had to the accompanying drawings, forming a part hereof.

In present day automobile construction semi-elliptic springs are used for the front axle practically to the exclusion of all other types and it is with steering mechanism in association with springs of this character that this invention is primarily concerned. Semi-elliptic springs are connected to the front axle at about their mid-points and have their front eyes fastened to the frame of the chassis and their rear eyes attached pivotally to short links on the frame, whereby a toggle movement is permitted. In this way all movements of the axle relatively to the frame are in an arc described about the relatively fixed front eye of the spring. Of course, this truly arcuate movement is modified to some extent by the resiliency of the spring itself. It is now the common practice to provide steering mechanism in association with semi-elliptic springs which is designed without regard to the movements of the axle referred to. Such movements of the axle, resulting from irregularities in the road surface, etc., are, of course, transmitted to the steering mechanism and result in the constant movement of the steering wheel. This movement is objectionable and it has been proposed to eliminate it by providing some positive locking arrangement in the steering gear whereby the movements of the axle are abruptly combated. The resulting strains on the gear are, of course, enormous.

The present invention takes into account the spring construction and the disposition of the axle with respect to the spring and seeks to provide a steering mechanism in which the movements of the axle are compensated for by reason of the construction of the steering gear, so that no strain is imposed on any part of the steering gear and no movement of the steering wheel is occasioned by the vibrations of the axle. The construction itself is simple in character, of a rugged nature, and embodies all of the recognized features of approved practice.

The invention will be described in greater detail with reference to the accompanying drawings, in which—

Figure 1 is a fragmentary view in front elevation of so much of an automobile as is necessary for an understanding of the application of the improved steering mechanism thereto. Fig. 2 is a fragmentary view in plan, of so much of the automobile as is shown in Fig. 1, the vehicle body, however, being omitted. Fig. 3 is a fragmentary view in side elevation of the car shown in the previous figures, parts being broken away in the interest of clearness.

The frame $a$ of the automobile is supported on the dead axle $b$ through semi-elliptic springs $c$ disposed adjacent the ends of the axle and having their front eyes $c'$ fixedly secured to the frame $a$ and their rear eyes $c^2$ pivotally connected to short links $d$ which, in turn, are pivotally connected to the frame $a$, these links permitting a slight toggle movement of the springs. The usual stud axles $e$ are rotatably secured in the bifurcated ends $b'$ of the dead axle and are formed with forwardly extending steering knuckles $e'$, the front ends of which are pivotally interconnected by a laterally extending link $f$ disposed in parallelism to the axle $b$ in the usual manner. The steering effort is applied directly to one of the steering knuckles $e'$ from a radius rod $g$, through a short curved arm $h$, one end of which is secured to one of the knuckles and the other end of which is connected to one end of the radius rod $g$, as through a ball and socket joint $g'$. Thus far, the steering mechanism is, in its essential features, of a type heretofore employed. However, the steering effort has never been applied to the steering wheels in the manner now to be described, and this improved manner, it is to be noted, is one in which full account is taken of the movements of the axle with relation to the frame and to the steering mechanism and the objectionable strains and movements heretofore impressed upon the steering gear are entirely eliminated. In the first place, it will be noted that the radius rod $g$ has its rear end connected to the link $h$ through a ball and socket joint $g'$ at a point which lies nearly on the arc of a circle struck off on the eye $c'$ through the axis of the axle. Again, the radius rod $g$ is disposed so as to extend forwardly in substantial parallelism with the springs $c$ and is connected at its front end to a steering arm $i$, through a ball and socket joint, indicated at $g^2$, which lies nearly on the axis of the front eye $c'$ of the spring $c$. Movement is imparted to the steering arm $i$ in any approved manner, as through a shaft $k$ on which is fixed a worm gear, indicated at $k'$, which, in turn, receives its movement through a worm, indicated at $l$, which is carried on the usual steering post $m$. Rotation of the steering post $m$ swings the arm $i$ about the shaft $k$ and transmits the steering effort to the radius rod $g$, for control of the vehicle. In the illustrated embodiment, it will be noticed that the worm $l$ and worm gear $k'$ are mounted well forward of the axle $b$, in order to facilitate the desirable results sought to be obtained by the remainder of the construction.

In operation, it is important that the geometrical relations of the various parts be kept in mind. In the first place, attention is to be directed to the dotted arc, indicated at C in Fig. 3, which has been described about the axis of the eye $c'$ of the spring $c$ with a radius equal to the distance between this axis and the axis of the axle. It is along this arc C that the axle moves under jolting forces imparted, for instance, by irregularities in the road surface and it is to be understood that every movement of the axle causes a corresponding movement of the steering knuckle $e'$ and the short link $h$ which is attached thereto. It is this movement of the associated steering devices which has always been heretofore transmitted to the steering post under the influence of the jolting axle, except where positive locking devices have been interposed between the post and the axle. Not only is it objectionable to have the steering post constantly oscillate but it is equally objectionable to employ positive locking devices to absorb the enormous strain imposed thereon by the jolting of the axle. By the present construction, neither of these objections is present. The ball and socket joint $g^2$ at the front end of the radius rod $g$ constitutes a relatively fixed point about which the radius rod may move and the ball and socket joint $g'$ at the rear end of the radius rod permits such movement along an arc indicated in Fig. 3 by the reference character G. Since the ball and socket joint $g'$ is near the axis of the axle $b$ and the ball and socket joint $g^2$ is near the axis of the eye $c'$ at the front end of the spring $c$ and since the length of the radius rod is, therefore, approximately equal to the distance between the eye $c'$ and the axle, it necessarily results that the arc of movement G of the end of the radius rod is nearly coincident with the arc of movement C of the axle $b$, so that movement of the axle $b$ is accompanied by a corresponding movement of the ball and socket joint $g'$ at the rear end of the radius rod. In other words, the radius rod swings in harmony with the swinging of the front half of the spring $c$ between the eye $c'$ and the axle $b$, and all movements of the axle are automatically compensated for. The radius rod has no tendency during movement of the axle to move axially and accordingly no strains are imposed upon any part of the steering mechanism by reason of movements of the axle and no tendency for the steering post to oscillate is ever present. So far as known, this solution of the problem of strains imposed upon the steering mechanism by movements of the axle and movements of the steering post caused in the same way, is here presented for the first time. So long as the radius rod or equivalent element is caused to move in sympathy with the movements of the axle about the eye $c'$, adequate compensation for such movements is afforded.

Rearrangements of the parts and substitution of equivalents for the devices described may be resorted to without departing from the spirit of the invention provided the inventive thought is retained in the form of a construction by which the compensation described is effected in a manner which can be reduced to the geometrical solution proposed.

I claim as my invention:

1. In an automobile, in combination with the main frame and axle, springs secured to the axle and pivotally fixed with respect to the frame at one of their ends to permit swinging movement of the axle in an arc about their fixed ends, and steering means including a radius rod pivoted at one end at a point substantially in the same horizontal plane with the said pivoted ends of the springs and normally nearly on the axis through the pivoted ends of the springs and pivoted at the other end nearly on the arc of movement of the axle about said pivoted ends of the springs whereby the arcs of movement of the axle and the last named end of the radius rod practically coincide.

2. In an automobile, in combination with the main frame and axle, semi-elliptic springs secured to the axle and pivoted at their front ends to the main frame to permit swinging movement of the axle in an arc about their fixed ends, steering knuckles for the wheels, a steering arm and a radius rod pivoted at one end to the steering arm at a point substantially in the same horizontal plane with the said pivoted ends of the springs and normally nearly on the axis through the pivoted ends of the springs and pivoted at the other end to the steering knuckle of one of the wheels nearly on the arc of movement of the axle about said pivoted ends of the springs whereby the arcs of movement of the axle and the last named end of the radius rod practically coincide.

3. In an automobile, in combination with the main frame and axle, semi-elliptic springs secured to the axle and pivoted at their front ends to the main frame to permit swinging movement of the axle in an arc about their fixed ends, steering knuckles for the wheels, a steering post terminating at a point in front of the axle, a swinging steering arm operatively connected to said post, and a radius rod pivotally connected at its front end to said steering arm through a ball and socket joint substantially in the same horizontal plane with the said pivoted ends of the springs and normally nearly on the axis through the pivoted ends of the springs and pivoted at its rear end with a ball and socket joint to the steering knuckle of one of the wheels nearly on the arc of movement of the axle about said pivoted ends of the springs whereby the arcs of movement of the axle and the last named end of the radius rod practically coincide.

This specification signed this 15th day of October, A. D. 1915.

A. F. MASURY.